US006928251B2

(12) United States Patent
Yoshihara et al.

(10) Patent No.: US 6,928,251 B2
(45) Date of Patent: Aug. 9, 2005

(54) IMAGE FORMING DEVICE INCLUDING FRAMES FORMED OF RESIN CONTAINING NO GLASS FIBERS

(75) Inventors: Hideo Yoshihara, Dongguan (CN); Shusaku Tsusaka, Nagoya (JP); Yoshiteru Hattori, Bisai (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 10/638,319

(22) Filed: Aug. 12, 2003

(65) Prior Publication Data

US 2004/0095456 A1 May 20, 2004

(30) Foreign Application Priority Data

Aug. 19, 2002 (JP) ....................................... 2002-237966

(51) Int. Cl.$^7$ ........................... G03G 15/00; B41J 2/41; G01D 15/28

(52) U.S. Cl. ....................................... 399/107; 347/152

(58) Field of Search ........................... 399/1, 107, 109, 399/316, 381, 388, 411, 382; 347/138, 152, 170, 222, 245, 263

(56) References Cited

U.S. PATENT DOCUMENTS

| | | | | | |
|---|---|---|---|---|---|
| 5,528,342 | A | * | 6/1996 | Setoriyama | 399/107 |
| 6,084,622 | A | * | 7/2000 | Sugiura et al. | 347/170 |
| 6,205,302 | B1 | * | 3/2001 | Yokota | 347/152 X |
| 6,259,872 | B1 | * | 7/2001 | Fukunaga et al. | 399/107 |

FOREIGN PATENT DOCUMENTS

| | | |
|---|---|---|
| JP | A 8-262827 | 10/1996 |
| JP | A 10-254199 | 9/1998 |
| JP | B2 3125540 | 11/2000 |
| JP | A 2002-3615 | 1/2002 |

* cited by examiner

*Primary Examiner*—Sandra L. Brase
(74) *Attorney, Agent, or Firm*—Oliff & Berridge, PLC

(57) ABSTRACT

Left and right frames are formed of a resin containing no glass fibers and bridged together by a tray formed of steel, a chute formed of resin, and underbars formed of steel. Each frame has a box-shape configured of a plate surface and side surfaces formed by bending the edges of plate surface in a common direction perpendicular to the plate surface, thereby preventing the plate surface from bending significantly. When the tray and underbars expand, then the frames bend slightly to absorb the load.

16 Claims, 6 Drawing Sheets

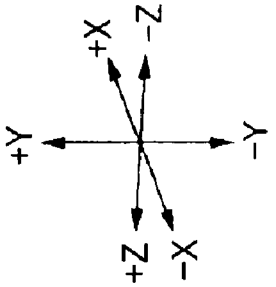
FIG.4
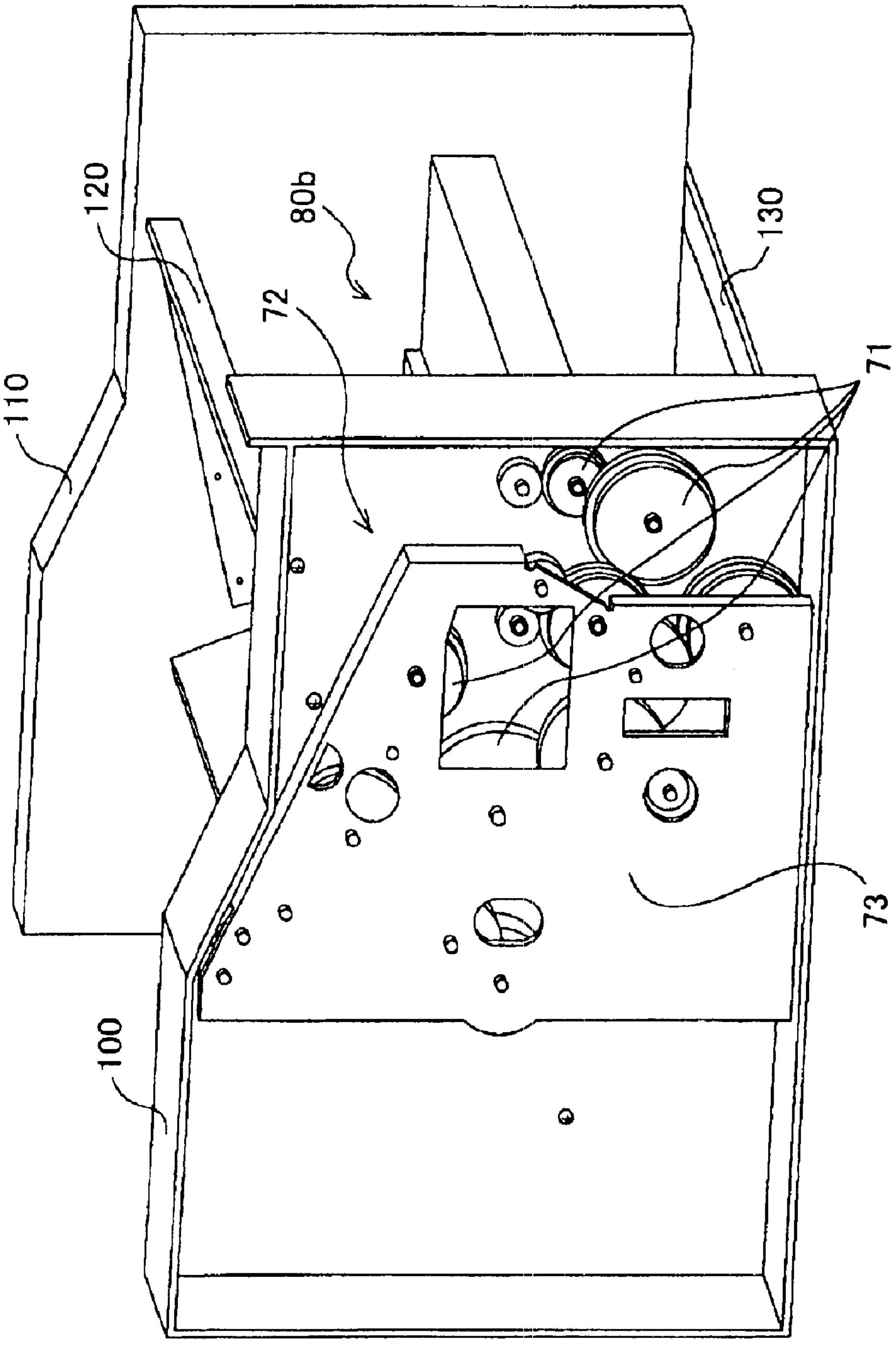

IMAGE FORMING DEVICE INCLUDING FRAMES FORMED OF RESIN CONTAINING NO GLASS FIBERS

BACKGROUND OF THE INVENTION

1. Field of the Invention

The present invention relates to an image forming device constructed of a resin material that can be easily recycled.

2. Description of the Related Art

An image forming device, such as a laser printer or a copy machine, well known in the art includes various devices, such as a processing device including a photosensitive member, a fixing device, and the like. An electrostatic latent image is formed on the photosensitive member by charging and exposing the surface of the photosensitive member to light from a laser, LED, or the like. The latent image is developed with toner or another developer into a visible image and transferred onto a recording medium, such as paper. The transferred image is fixed to the paper with heat in the fixing device to complete the image formation process. These devices of the image forming device are supported between left and right frames in a casing. The frames must have sufficient strength to withstand the weight of these devices. Conventionally, the frames in the image forming device have been formed using steel or resin containing glass fibers for reinforcing the frames.

When constructing the frames with steel, however, parts required for detachably supporting the devices must be mounted in the frames. Hence, there is an increase in the number of parts in the image forming device and the amount of time required for mounting these parts, leading to an increase in production costs.

When the frames are constructed of a resin including glass fibers, it is unnecessary to provide such parts for supporting the devices to the frames. However, the frames have limited applications when being used for producing recycled parts, due to the glass fiber content.

SUMMARY OF THE INVENTION

In the view of foregoing, it is an object of the present invention to overcome the above problems, and also to provide an image forming device formed of a resin material that can be easily recycled.

In order to attain the above and other objects, the present invention provides an image forming device including a pair of frames formed of a synthetic resin including no glass fibers and a processing unit accommodated between the pair of frames. The processing unit includes an electrostatic latent image carrying member, a developing unit that develops an electrostatic latent image formed on the electrostatic latent image carrying member with a developer into a visible image, and a transfer member that transfers the visible image from the electrostatic latent image carrying member onto a recording medium.

There is also provided an image forming device including a processing unit and a conveying guide member disposed below the image forming device. The processing unit includes an electrostatic latent image carrying member, a developing unit that develops an electrostatic latent image formed on the electrostatic latent image carrying member with developer into a visible image, and a transfer member that transfers the visible image from the electrostatic latent image carrying member onto a recording medium. The conveying guide member guides the recording medium that is conveyed over the top surface of the conveying guide member. The conveying guide member includes a non-flame-retardant resin part that does not include a flame retardant and a flame-retardant resin part that includes a flame retardant.

There is also provided a frame used in an image forming device. The frame includes a pair of frame members formed of a synthetic resin including no glass fibers and a member that bridges the frame members. Each of the frame members has a box shape. The reinforcing member includes a non-flame-retardant resin part that does not include a flame retardant and a flame-retardant resin part that includes a flame retardant.

BRIEF DESCRIPTION OF THE DRAWINGS

In the drawings:

FIG. 4 is a perspective view showing the left and right frames of the laser printer from a left, front angle;

PREFERRED EMBODIMENT OF THE PRESENT INVENTION

A laser printer 1 according to an embodiment of the present invention will be described with reference to the accompanying drawings. First, overall structure of the laser printer 1 will be described with reference to FIG. 1.

Figure 1:
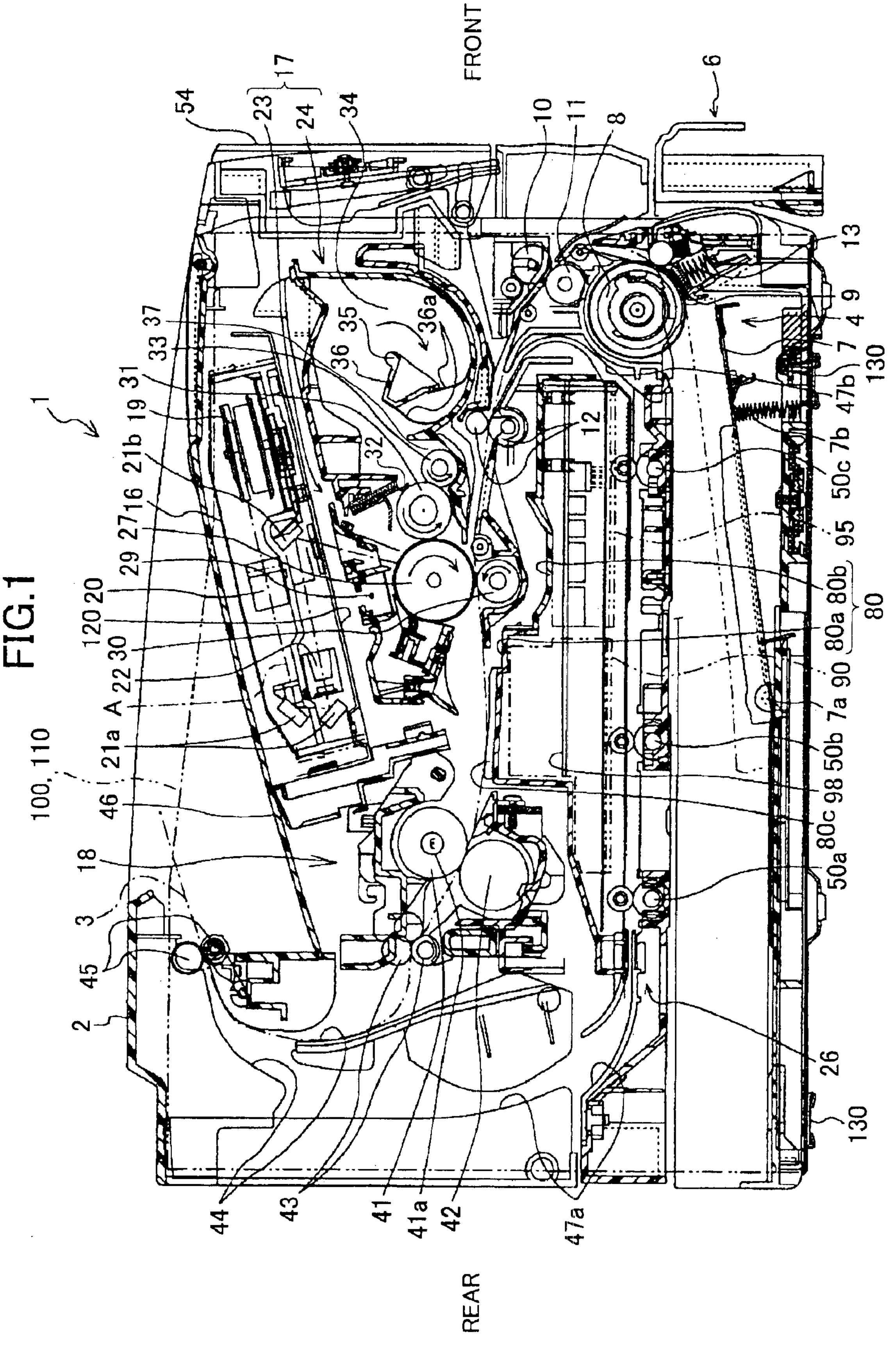
FIG. 1 is a center cross-sectional view showing a laser printer according to an embodiment of the present invention.
Figure 2:
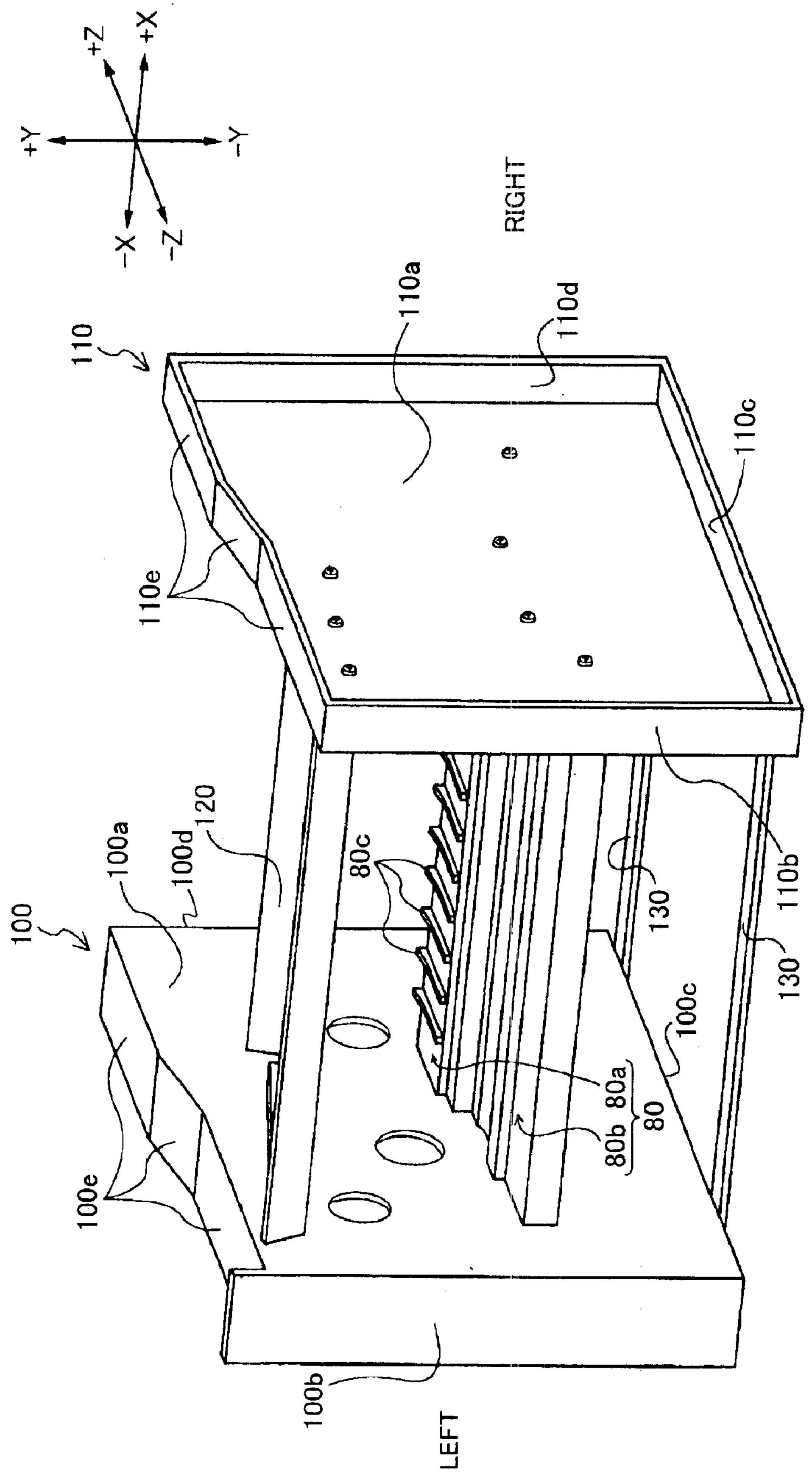
FIG. 2 is a perspective view showing left and right frames of the laser printer from a right, front angle.

As shown in FIG. 1, the laser printer 1 includes a feeder section 4, an image forming section, and a duplex printing unit 26, all accommodated in a main body case 2. The feeder section 4 is for feeding a sheet 3. The image forming section is for forming a predetermined image on the fed sheet 3, and includes a scanner unit 16, a process cartridge 17, and a fixing unit 18.

The process cartridge 17 is housed in a space provided close to the front upper surface of the main body case 2. The space is covered by a cover 54, which is provided on the front side of the main body case 2 so as to be pivotable downward. The process cartridge 17 is inserted and removed where the cover 54 is opened widely. The fixing unit 18 is disposed downstream from the process cartridge 17 with respect to a sheet feed direction of the sheet 3, on a rear end side in a lower part of the main body case 2.

A sheet delivery tray 46 is located at the upper center surface of the main case body 2, slanting upward to form a recessed shape. Printed sheets 3 are discharged from the main case body 2 into the stack on the tray 46.

A sheet delivery path 44 is provided at the rear part in the main body case 2. The sheet delivery path 44 is formed in a semi-arc shape that extends vertically along the back of the main body case 2. The sheet delivery path 44 delivers the sheet 3 from the fixing unit 18 to the sheet delivery tray 46. A sheet delivery roller 45 for conveying the sheet 3 is provided along the sheet delivery path 44.

The feeder section 4 will be described in detail. The feeder section 4 includes a sheet feed tray 6, a sheet feed roller 8, a sheet pressing plate 7, a separation pad 9, a paper powder removing roller 10, a conveying roller 11, and registration rollers 12. The sheet feed tray 6 is detachably mounted on the front side of the main body case 2. The sheet feed tray 6 is pulled forward to remove the sheet feed tray 6 from the main body case 2 and pushed rearward to mount onto the main body case 2.

The sheet feed roller 8 is provided in a bottom part of the main body case 2. The sheet pressing plate 7 is provided in the sheet feed tray 6, and the sheets 3 are stacked on the sheet pressing plate 7. The sheet pressing plate 7 is pivotable about a shaft 7*a*, which is supported by the bottom surface of the sheet feed tray 6 at the rear end of the sheet pressing plate 7, such that the front end of the sheet pressing plate 7 moves upward and downward. Also, the sheet pressing plate 7 is biased toward the sheet feed roller 8 by a spring 7*b* from its under surface. The sheet pressing plate 7 pivots downward against the biasing force of the spring 7*b* by an amount proportional to the stacked quantity of sheets 3, and the sheets 3 are pressed into contact with the sheet feed roller 8.

The separation pad 9 is disposed in confrontation with the sheet feed roller 8 and pressed toward the sheet feed roller 8 by a spring 13 disposed on the back of the separation pad 9. The separation pad 9 nips and conveys the sheets 3 one at a time in cooperation with the sheet feed roller 8 at the time of sheet feed.

The conveying roller 11 is provided downstream from the sheet feed roller 8 with respect to the sheet feed direction. The conveying roller 11 performs conveyance of the sheets 3. The paper powder removing roller 10 is in contact with the conveying roller 11 with the sheet 3 therebetween to remove paper powder from the sheet 3 and also conveys the sheet 3 in cooperation with the conveying roller 11. The registration rollers 12 are provided downstream from the conveying roller 11 with respect to the sheet feed direction for adjusting timing for delivering the sheet 3 at the time of printing.

Next, the scanner unit 16 will be described in detail. The scanner unit 16 includes a laser beam emitting section (not shown), a polygon mirror 19, a fθ lens 20, reflecting mirrors 21*a*, 21*b*, and a relay lens 22. The laser beam emitting section is located right below the sheet delivery tray 46 and irradiates a laser beam. The polygon mirror 19 rotates to scan the laser beam from the laser beam emitting section in a main scanning direction across the surface of a photosensitive drum 27 (described later). The fθ lens 20 is for stabilizing scanning speed of the laser beam reflected from the polygon mirror 19. The reflecting mirrors 21*a*, 21*b* are for reflecting the laser beam. The relay lens 22 is for adjusting the focal position in order to focus the laser beam from the reflecting mirror 21 onto the photosensitive drum 27. With this configuration, the laser beam is irradiated from the laser beam emitting section based on image data and passes through or is reflected by the polygon mirror 19, the fθ lens 20, the reflecting mirror 21*a*, the relay lens 22, and the reflection mirror 21*b* in this order as indicated by an alternate long and dash lines A in FIG. 1 to expose and scan the surface of the photosensitive drum 27.

Next, the process cartridge 17 will be described. The process cartridge 17 includes a drum cartridge 23 and a developing cartridge 24 that is detachably mounted on the drum cartridge 23. The drum cartridge 23 includes the photosensitive drum 27, a Scorotron charger 29, and a transfer roller 30. The developing cartridge 24 includes a developing roller 31, a supply roller 33, a toner hopper 34, and a developing chamber 37. A layer thickness control blade 32 and an agitator 36 are disposed within the developing chamber 37 and the toner hopper 34, respectively.

The photosensitive drum 27 is arranged in contact with the developing roller 31 and rotatable clockwise as indicated by an arrow in FIG. 1. The photosensitive drum 27 includes positively charging organic photo conductor coated on a conductive base material. The positively charging organic photo conductor is made from a charge transfer layer dispersed with a charge generation material on a charge generation layer. When the photosensitive drum 27 is exposed by a laser beam, the charge generation material absorbs the light and generates a charge. The charge is transferred onto the surface of the photosensitive drum 27 and the conductive base material through the charge transfer layer and counteracts the surface potential charged by the Scorotron charger 29. As a result, a potential difference is generated between regions of the photosensitive drum 27 that were exposed and regions that were not exposed by the laser light. By selectively exposing and scanning the surface of the photosensitive drum 27 with a laser beam based upon image data, an electrostatic latent image is formed on the photosensitive drum 27.

The Scorotron charger 29 is disposed above the photosensitive drum 27 at a position separated from the photosensitive drum 27 by a predetermined distance. The Scorotron charger 29 generates a corona discharge from a tungsten wire, for example, and is turned ON by a charging bias circuit unit (not shown) of a high-voltage power source circuit board 95 (described later) to positively charge the surface of the photosensitive drum 27 to a uniform charge.

The developing roller 31 is disposed further downstream than the Scorotron charger 29 with respect to the rotation direction of the photosensitive drum 27. The developing roller 31 is rotatable counterclockwise as indicated by an arrow in FIG. 1. The developing roller 31 includes a roller shaft made from metal coated with a roller made from a conductive rubber material. A development bias is applied to the developing roller 31 from a development bias circuit unit (not shown) of the high-voltage power source circuit board 95.

The supply roller 33 is rotatably disposed beside the developing roller 31 on the opposite side from the photosensitive drum 27 across the developing roller 31. The supply roller 33 is in pressed contact with the developing roller 31. The supply roller 33 is rotatable counterclockwise as indicated by an arrow in FIG. 1, which is the same rotation direction as the developing roller 31. The supply roller 33 includes a roller shaft made of metal coated with a roller made of a conductive foam material and charges toner supplied to the developing roller 31 by friction.

The toner hopper 34 is provided beside the supply roller 33 and filled with developer, which is to be supplied to the developing roller 31 by the supply roller 33. In this embodiment, non-magnetic, positive-charging, single-component toner is used as a developer. The toner is a polymeric toner obtained by copolymerizing polymeric monomers using a well-known polymerization method, such as suspending polymerization. Examples polymeric monomers include styrene monomers and acrylic monomers. Styrene is an example of a styrene monomer. Examples of acrylic monomers include acrylic acid, alkyl (C1 to C4) acrylate, and alkyl (C1 to C4) methacrylate. A coloring agent such as carbon black, wax, and the like are mixed in the polymeric toner. An externally added agent such as silica is also added in order to improve fluidity. A particle diameter of the polymeric toner is approximately 6 to 10 $\mu$m.

The agitator 36 has a coarse mesh-like plate shape extending in the axial direction (the near-to-far direction in the drawing) and has a bend in the middle when viewed as a cross-section. A rotating shaft 35 is disposed on one end of the agitator 36, and film members 36*a* are provided on the other end of the agitator 36 and in the bend in the middle of the agitator 36 for scraping the inner wall of the toner hopper 34. The rotating shaft 35 is rotatably supported in the center of both lengthwise ends of the toner hopper 34 and, hence, supports the agitator 36. When the agitator 36 is rotated in the direction indicated by the arrow, toner accommodated in the toner hopper 34 is agitated and supplied into the developing chamber 37.

A transfer roller 30 is disposed below the photosensitive drum 27 and downstream from the developing roller 31 with respect to the rotating direction of the photosensitive drum 27. The transfer roller 30 is rotatable counterclockwise as indicated by an arrow in FIG. 1. The transfer roller 30 includes a metal roller shaft coated with a roller made from an ion-conductive rubber material. During the transfer process, a transfer bias circuit unit (not shown) of the high-voltage power source circuit board 95 applies a transfer forward bias to the transfer roller 30. The transfer forward bias generates a potential difference between the surfaces of the photosensitive drum 27 and the transfer roller 30. The potential difference electrically attracts toner that electrostatically clings to the surface of the photosensitive drum 27 to the surface of the transfer roller 30.

Next, the fixing unit 18 will be described. The fixing unit 18 includes a heating roller 41, a pressing roller 42 for pressing the heating roller 41, and a pair of conveying rollers 43. The conveying rollers 43 are provided downstream from the heating roller 41 and the pressing roller 42. The heating roller 41 is formed by coating a hollow aluminum roller with a fluorocarbon resin and sintering the assembly. The heating roller 41 includes a metal tube and a halogen lamp for heating inside the metal tube. The pressing roller 42 includes a silicon rubber shaft having low hardness that is covered by a tube formed of a fluorocarbon resin. The silicon rubber shaft is urged upward by a spring (not shown), pressing the pressing roller 42 against the heating roller 41. While the sheet 3 from the process cartridge 17 passes between the heating roller 41 and the pressing roller 42, the heating roller 41 pressurizes and heats toner that was transferred onto the sheet 3 in the process cartridge 17, thereby fixing the toner onto the sheet 3. Afterward, the sheet 3 is transported to the sheet delivery path 44 by the conveying rollers 43.

Next, the duplex printing unit 26 will be described. The duplex printing unit 26 is disposed above the paper supply cassette 6 and includes reverse conveying rollers 50*a*, 50*b*, and 50*c* arranged in a substantially horizontal orientation. A reverse conveying path 47*a* is provided on the rear side of the reverse conveying roller 50*a*, while a reverse conveying path 47*b* is provided on the front side of the reverse conveying roller 50*c*. The reverse conveying path 47*a* extends from the discharge roller 45 to the reverse conveying rollers 50*a* and branches off from the discharge path 44 near the end of the same in the sheet feed direction of the paper 3. The reverse conveying path 47*b*, on the other hand, extends from the reverse conveying roller 50*c* to the register rollers 12.

When performing duplex printing, an image is first formed on one side of the paper 3, after which a portion of the paper 3 is discharged onto the discharge tray 46. When the trailing edge of the paper 3 becomes interposed between the discharge rollers 45, the discharge rollers 45 stop rotating forward and begin rotating in reverse. At this time, the trailing edge of the paper 3 contacts the arcuate surface of the discharge path 44 and is guided along this surface to the reverse conveying path 47*a*, without returning to the discharge path 44. The paper 3 is conveyed from the reverse conveying path 47*a* to the reverse conveying rollers 50*a*, 50*b*, and 50*c* and is subsequently guided to the register rollers 12 along the reverse conveying path 47*b*. According to this operation, the paper 3 is conveyed to the image forming unit with its front and back surfaces switched in order to form a prescribed image on the other side of the paper 3.

A low-voltage power source circuit board 90, the high-voltage power source circuit board 95, and an engine circuit board 98 are provided between the duplex printing unit 26 and the image forming unit. A chute 80 is disposed between these circuit boards 90, 95, and 98 and the image forming unit for separating these circuit boards 90, 95, 98 from the fixing unit 18, the processing cartridge 17, and other devices. The chute 80 is formed of a resinous material. Guide plates 80*c* are provided on the top of the chute 80, constructing a portion of the conveying path for the paper 3.

The high-voltage power source circuit board 95 generates a high-voltage bias that is applied to components in the processing cartridge 17. The low-voltage power source circuit board 90 functions to drop the voltage supplied from a source external to the laser printer 1, such as a single-phase 100V source, to a voltage of 24V, for example, to be supplied to components in the laser printer 1. The low-voltage power source circuit board 90 uses electronic components (not shown) that tend to generate relatively high heat, such as transformers and three-terminal regulators. The current flowing in the circuit of the low-voltage power source circuit board 90 is larger than that in the circuit of the high-voltage power source circuit board 95, and the electronic parts of the low-voltage power source circuit board 90 generate a large amount of heat.

The engine circuit board 98 drives a DC motor (not shown), which is the source for driving parts involved in mechanical operations, such as the rollers in the laser printer 1, a solenoid (not shown) for switching the operating direction of this drive system, and the like. A relatively large current is required to drive the DC motor, solenoid, and the like. The electronic parts provided on the engine circuit board 98 for controlling this current generate a large amount of heat.

The electronic parts in the circuit boards 90, 95, and 98 are disposed on one side surface of the same.

A left frame 100 and a right frame 110 are provided in the main body case 2. The left and right frames 100 and 110 support various components, including the paper supply cassette 6, the scanning unit 16, the processing cartridge 17, the fixing unit 18, and the conveying system. The frames 100 and 110 are each formed as a separate part from a thermoplastic resin that contains no glass fibers for reinforcement.

Here, it should be noted that, in FIGS. 2 to 6, directions −Z, −X, +X, +Z, +Y, and −Y indicate frontward, leftward, rightward, rearward, upward, and downward directions, respectively, of the laser printer 1.

The right frame 110 is a box-like construction having a plate surface 110*a* that is substantially rectangular in shape, and side surfaces 110*b*, 110*c*, 110*d*, and 110*e* that are all bent to a common direction X perpendicular to the plate surface 110*a*. Similarly, the left frame 100 is formed in a box-like construction having a plate surface 100*a* that is substantially rectangular in shape, and side surfaces 100*b*, 100*c*, 100*d*, and 100*e* that are bent in the common direction X that is perpendicular to the plate surface 100*a*.

Adjacent side surfaces 100*b*–100*e*, 110*b*–110*e* are joined together, such that the surfaces of the plate surface 100*a* and the plate surface 110*a* in each of the four corners thereof and the two side surfaces joined at these corner positions are all orthogonal to each other and therefore support each other. Since the material forming the plate surface 100*a* and the plate surface 110*a* does not contain fiberglass, these components are not strong and can bend easily. However, by forming the edges of the plate surfaces 100*a* and 110*a* perpendicular to the plate surfaces 100*a* and 110*a*, these components are strengthened by the side surfaces 100*b*–100*e* and 110*b*–110*e*, thereby preventing the plate surfaces 100*a* and 110*a* from bending significantly.

Figure 3:
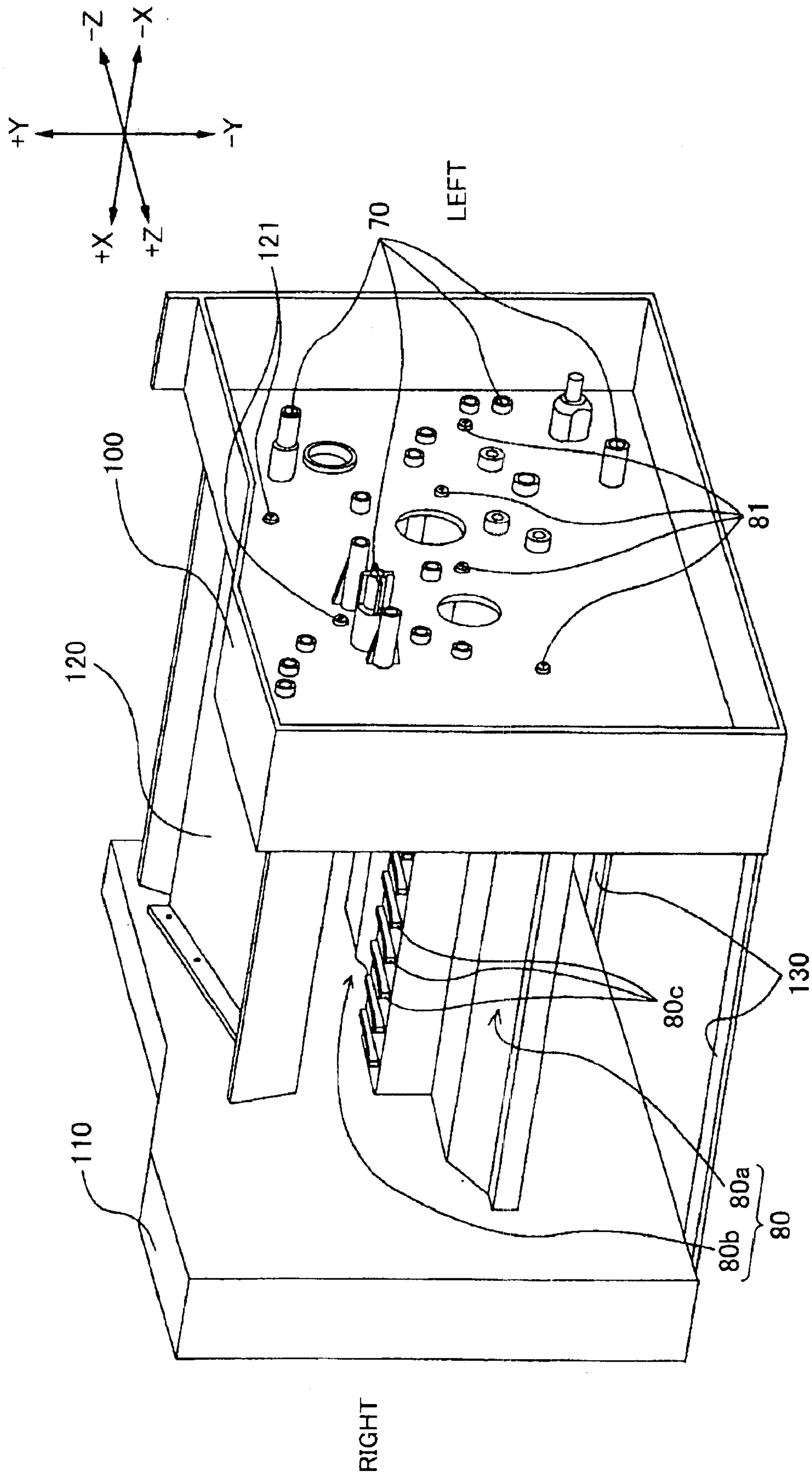
FIG. 3 is a perspective view showing the left and right frames of the laser printer from a left, rear angle.

As shown in FIG. 3, a plurality of bearings 70 are provided in the plate surface 100*a*. Gears 71 shown in FIG. 4 and a cam (not shown) engage with these bearings 70. A drive system 72 (FIG. 4) is constructed of these gears 71 and the cam and serves to rotate various rollers in the processing cartridge 17, the fixing unit 18, the conveying system, and the like. As shown in FIG. 4, a support plate 73 is fixed to the left frame 100 for covering the drive system 72 and for preventing the plurality of gears 71 from coming off the bearings 70.

Grease is applied to the surfaces of the gears 71 that contact the left frame 100 in order to reduce the effects of abrasion and the like due to rubbing between the left frame 100 and the gears 71. Accordingly, the left frame 100 must be resistant to grease in order to withstand corrosion caused thereby. In the present embodiment, the left frame 100 is formed primarily from an ABS resin, such as CYCOLAC (registered trademark) EX120 manufactured by UMG ABS, Ltd. Since the drive system 72 is not provided on the right frame 110, the right frame 110 does not require superior grease resistance and can be formed primarily of the cheaper polystyrene resin. Therefore, in order to reduce production costs, the right frame 110 in the present embodiment is formed primarily of a polystyrene resin, such as the STYRON (registered trademark) XL-8023VC manufactured by A&M Styrene Co., Ltd.

As shown in FIG. 3, the left frame 100 and the right frame 110 are bridged by a tray 120 in the top section, the chute 80 in the middle section, and two steel underbars 130 in the bottom section, fixing the positional relationship between the left frame 100 and the right frame 110. The tray 120 is a steel plate substantially rectangular in shape that is given a tray-shape by bending both edges in the shorter direction Z upward to a direction substantially vertical (approximately the direction Y). The scanning unit 16 is fixed on top of the tray 120. Both ends of the tray 120 in the longer direction X are also bent in the direction Y and are parallel to the plate surfaces 100*a* and 110*a*. These bent ends are fixed to each of the left and right frames 100 and 110 in three locations by screws 121.

Figure 5:
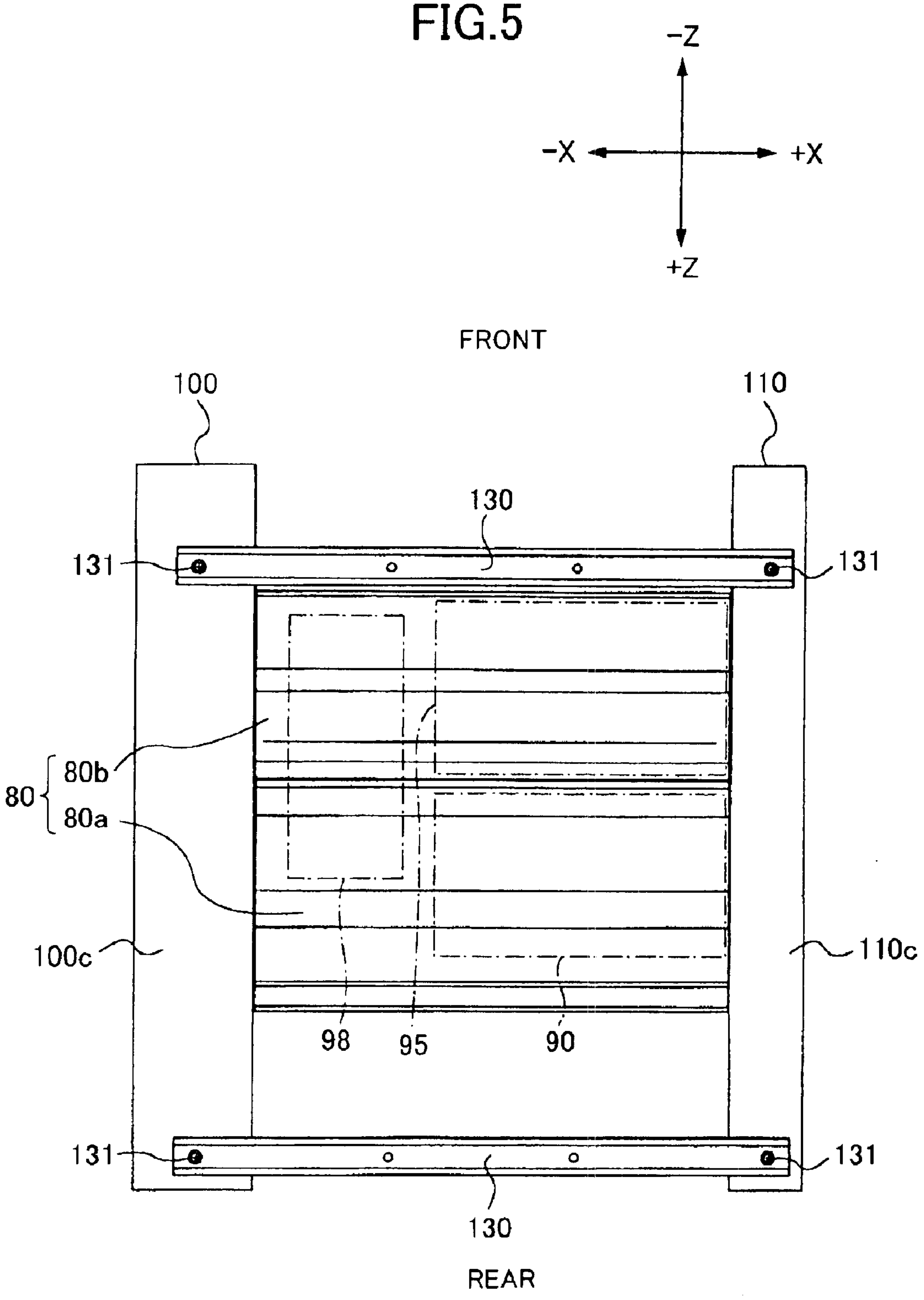
FIG. 5 is a bottom view showing the left and right frames of the laser printer.

The steel underbars 130 are narrow steel plates. As shown in FIG. 5, the steel underbars 130 are slightly longer than the tray 120 in the direction X. As shown in FIG. 1, both edges of each of the steel underbars 130 in the direction Z are folded over toward the center of the steel underbars 130 to increase the strength of the steel underbars 130 for resisting bends in the direction X. As shown in FIG. 5, the two steel underbars 130 bridge the left frame 100 and the right frame 110 parallel to one another and are positioned one in the front section of the laser printer 1 and one in the rear section of the laser printer 1. Both lengthwise ends of the steel underbars 130 are fixed to the bottom surfaces of the side surfaces 100*c* and 110*c* by screws 131.

Figure 6:
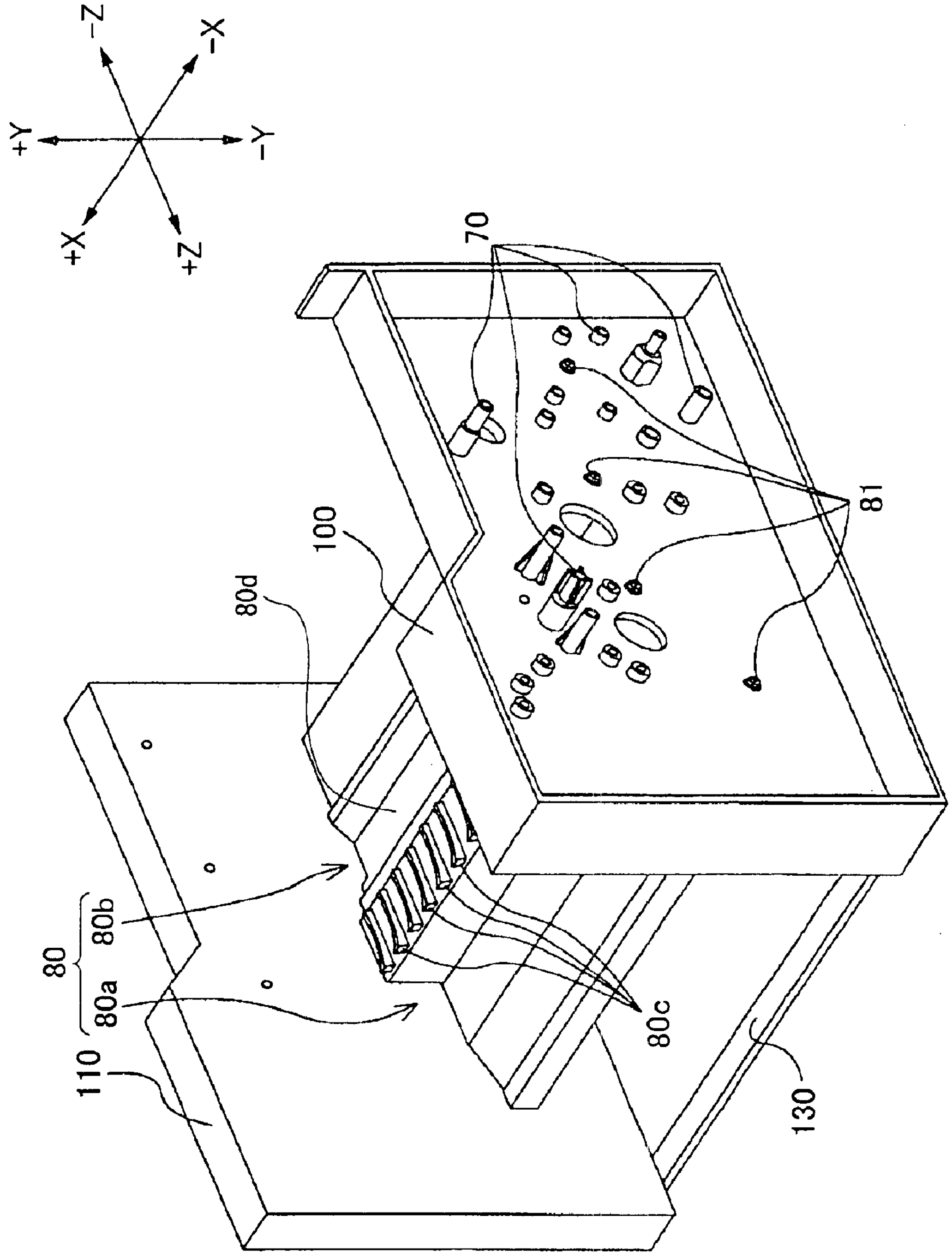
FIG. 6 is a perspective view showing the left and right frames of the laser printer from a left; rear angle.

As shown in FIG. 6, the chute 80 includes a first chute 80*a* and a second chute 80*b* that are joined together. The first chute 80*a* is formed of a polycarbonate/high impact polystyrene (PC/HIPS) formed by mixing a flame-retardant additive in a resin, such as the Novalloy (registered trademark) X7203L manufactured by Daicel Polymer Ltd. The second chute 80*b*, however, is formed of a cheaper polystyrene resin that does not contain any flame-retardant additives or glass fiber reinforcement.

The chute 80 is equivalent in width to the interval between the left frame 100 and the right frame 110. A recess 80*d* extending in the direction X is formed in the chute 80. Part of the recess 80*d* has a slanted surface. This construction reinforces the chute 80 against bending in the direction X, enabling the chute 80 to function as a reinforcing member that fixes the left frame 100 to the right frame 110.

As described above, the chute 80 protects the low-voltage power source circuit board 90, the high-voltage power source circuit board 95, and the like provided between the left frame 100 and the right frame 110 by separating these components from the fixing unit 18 and the processing cartridge 17 disposed thereabove. This separation prevents the low-voltage power source circuit board 90, the high-voltage power source circuit board 95, and the like from being exposed externally when the processing cartridge 17 is installed or removed. A portion of the top surface on the first chute 80*a* also serves to guide the paper 3 to the fixing unit 18. As shown in FIG. 6, a plurality of guide plates 80*c* extending in the sheet feed direction (direction Z) are arranged in a row along the direction X on the top surface of the first chute 80*a*.

Since the chute 80 functions both to fix the left frame 100 to the right frame 110 and as a guide, there is no need to provide separate parts for performing these functions. Hence, the space within the laser printer 1 can be effectively used and the number of parts reduced.

As shown in FIG. 5, the low-voltage power source circuit board 90 is disposed beneath the first chute 80*a* near the right frame 110, with the surface on which electronic parts are mounted facing upward. As described above, the low-voltage power source circuit board 90 employs electronic parts that generate a relatively large amount of heat. By covering the top of the low-voltage power source circuit board 90 having these sources of heat with the flame-retardant first chute 80*a*, the fire safety of the laser printer 1 is improved. Here, when the processing cartridge 17 is exposed to high heat, toner accommodated in the processing cartridge 17 softens which causes such effects as poor fluidity of the toner and leads to such problems as irregular transfers of toner onto the paper 3. However, by separating the low-voltage power source circuit board 90 from the processing cartridge 17 using the first chute 80*a* in the present embodiment, the present invention can prevent such problems from occurring in the processing cartridge 17 caused by heat generated from the low-voltage power source circuit board 90.

Further, the high-voltage power source circuit board 95 is disposed beneath the second chute 80*b* near the right frame 110, with the surface on which electronic parts are mounted facing upward. Since only a maximum current of about several mA flows in the circuitry of the high-voltage power source circuit board 95 and the amount of heat generated from electronic parts used on the high-voltage power source circuit board 95 is not large enough to compromise safety, the second chute 80*b* covering the top of the high-voltage power source circuit board 95 does not need to be formed of a flame-retardant material.

By constructing the chute 80 by joining the flame-retardant first chute 80*a* formed of an expensive material and the second chute 80*b* formed of a cheap material, less of the expensive flame-retardant material need to be used, thereby reducing production costs.

The engine circuit board 98 is disposed beneath the chute 80 near the left frame 100, with the surface on which electronic parts are mounted facing downward. However, since the engine circuit board 98 includes electronic parts that generate a relatively large amount of heat as described above, the engine circuit board 98 is disposed beneath both the first chute 80*a* and the second chute 80*b* such that at least the electronic parts that generate a large amount of heat are covered by the first chute 80*a*.

Next, operations of the laser printer 1 during printing will be described with reference to FIG. 1. The sheet 3 located at the top among the sheets stacked on the sheet pressing plate 7 is pressed toward the sheet feed roller 8 by the spring 7*b* from the back of the sheet pressing plate 7. When printing is started, the sheet 3 is fed by frictional force between the sheet 3 and the rotating sheet feed roller 8 to a position between the sheet feed roller 8 and the separation pad 9. Then, the sheet feed roller 8 and the separation pad 9 together transport the sheets 3 one at a time to the registration roller 12.

The laser beam emitting section (not shown) of the scanner unit 16 generates a laser beam based upon a laser drive signal generated by the engine circuit board 98. The laser beam falls incident on the polygon mirror 19. The polygon mirror 19 provides the laser beam with a scan movement in a main scanning direction (direction perpendicular to the conveying direction of the sheet 3) while reflecting the laser beam toward the fθ lens 20. The fθ lens 20 converts the laser beam to a constant angular speed. Then, the reflecting mirror 21*a* reflects the laser beam toward the relay lens 22, which converges the laser beam. The reflecting mirror 21*b* reflects the converged laser beam to focus on the surface of the photosensitive drum 27.

The Scorotron charger 29 charges the surface of the photosensitive drum 27 to, for example, a surface potential of approximately 1000V. The laser beam from the scanner unit 16 scans across the surface of the photosensitive drum 27 in the main scan direction. The laser beam selectively exposes and does not expose the surface of the photosensitive drum 27 based on the laser drive signal described above. That is, portions of the surface of the photosensitive drum 27 that are to be developed are exposed by the laser light and portions that are not to be developed are not exposed. The surface potential of the photosensitive drum 27 decreases to, for example, approximately 100V at exposed portions (bright parts). Because the photosensitive drum 27 rotates clockwise as indicated by an arrow in FIG. 1 at this time, the laser beam also exposes the photosensitive drum 27 in an auxiliary scanning direction, which is also the conveying direction of the sheet 3. As a result of the two scanning actions, an electrical invisible image, that is, an electrostatic latent image is formed on the surface of the photosensitive drum 27 from exposed areas and unexposed areas (dark parts).

The toner in the toner hopper 34 is conveyed to the development chamber 37 according to the rotation of the agitator 36. Then, the toner in the development chamber 37 is supplied to the developing roller 31 according to the rotation of the supply roller 33. At this point, the toner is frictionally charged positively between the supply roller 33 and the developing roller 31 and is further regulated to a layer with constant thickness by the layer thickness control blade 32. Then, the toner is borne on the developing roller 31. A positive bias of, for example, approximately 300V to 400V is applied to the developing roller 31. The toner, which is borne on the developing roller 31 and charged positively, is transferred to the electrostatic latent image formed on the surface of the photosensitive drum 27 when the toner comes into contact with the photosensitive drum 27. That is, because the potential of the developing roller 31 is lower than the potential of the dark parts (+1000V) and higher than the potential of the bright parts (+100V), the positively-charged toner selectively moves to the bright parts where the potential is lower. In this way, a visible image of toner is formed on the surface of the photosensitive drum 27.

The registration rollers 12 perform a registration operation on the sheet 3 to deliver the sheet 3 so that the front edge of the visible image formed on the surface of the rotating photosensitive drum 27 and the leading edge of the sheet 3 coincide with each other. A negative constant voltage is applied to the transfer roller 30 while the sheet 3 passes between the photosensitive drum 27 and the transfer roller 30. Because the negative constant voltage that is applied to the transfer roller 30 is lower than the potential of the bright part (+100V), the toner electrostatically clinging to the surface of the photosensitive drum 27 moves toward the transfer roller 30. However, the toner is blocked by the sheet 3 and cannot transfer to the transfer roller 30. As a result, the toner is transferred onto the sheet 3. In this manner, the visible image formed on the surface of the photosensitive drum 27 is transferred onto the sheet 3.

It should be noted that the laser printer 1 employs what is known as a cleanerless developing system, wherein the developing roller 31 recovers toner remaining on a surface of the photosensitive drum 27 after the transfer roller 30 transfers toner from the photosensitive drum 27 to the paper 3.

Then, the sheet 3 having the toner transferred thereon is conveyed to the fixing unit 18. The heating roller 41 of the fixing unit 18 applies heat of approximately 200 degrees, and the pressing roller 42 applies a pressure, to the sheet 3 with the toner image to fix the toner image permanently on the sheet 3. Note that the heating roller 41 and the pressing roller 42 are each grounded through diodes so that the surface potential of the pressing roller 42 is lower than the surface potential of the heating roller 41. Accordingly, the positively charged toner that clings to the heating roller 41 side of the sheet 3 is electrically attracted to the lower surface potential of the pressing roller 42. Therefore, the potential problem of the toner image being distorted because the toner is attracted to the heating roller 41 at the time of fixing is prevented.

The sheet delivery roller 43 discharges the sheet 3 with the fixed toner image from the fixing unit 18 and conveys the sheet 3 on the sheet delivery path 44. The sheet delivery roller 45 delivers the sheet 3 to the sheet delivery tray 46 with a toner image side facing downward. Similarly, the sheet 3 to be printed next is stacked over the earlier delivered sheet 3 with a printed surface facing downward in the delivery tray 46. In this way, a user can obtain the sheets 3 aligned in the order of printing.

When the laser printer 1 operates as described above, the low-voltage power source circuit board 90, a motor (not shown) for driving the drive system 72, the fixing unit 18, and the scanning unit 16, and the like generate heat that raises the overall internal temperature of the laser printer 1. This rise in overall temperature also increases the temperatures of the left and right frames 100 and 110, as well as the tray 120, the chute 80, and the steel underbars 130 spanning therebetween.

However, as described above, the tray 120 and the underbars 130 formed of steel have different properties from the left and right frames 100 and 110, and the like formed of resin. That is, the thermal expansion coefficient of the tray 120 and the underbars 130 is different from that of the left frame 100, the right frame 110, and the chute 80. When the tray 120 and the underbars 130 expand due to heat, the positions at which these parts are fixed to the left and right frames 100 and 110 move in the direction of expansion. Although the tray 120 and the underbars 130 expand in this manner due to heat, the left and right frames 100 and 110 do not expand or deform due to heat because of the difference in thermal expansion coefficient. Accordingly, the left and the right frames 100 and 110 receive a load as the tray 120 and the underbars 130 expand the interval between the left frame 100 and the right frame 110. However, because the left and right frames 100 and 110 do not include reinforcing materials, the left and right frames 100 and 110 can bend slightly in response to the expansion of the tray 120 and the underbars 130 and can absorb the load. Accordingly, the left and right frames 100 and 110 are prevented from being damaged caused by cracks deformations or the like.

In the laser printer 1 of the preferred embodiment described above, the left and right frames 100 and 110 are formed as separate parts using a resin that does not include reinforcing material, such as fiber glass. This construction simplifies the manufacturing process and enables the reduction of production costs. Further, the frames can be easily recycled and can be used for manufacturing a wide range of recycled products. Further, the strength of the left and right frames 100 and 110 is improved by bridging the same with the tray 120, the chute 80, and the underbars 130.

Since the chute 80 is configured by joining the first chute 80*a* formed of a flame-retardant resin and the second chute 80*b* formed of a non-flame-retardant resin, the first chute 80*a* and the second chute 80*b* can be recycled separately. Further, production costs can be kept low since a less amount of resin of the expensive flame-retardant type is used.

While spaces are formed between the left and right frames 100 and 110 for detachably mounting the processing cartridge 17 and the paper supply cassette 6, the space for mounting the processing cartridge 17 is formed between the tray 120 and the chute 80, while the space for mounting the paper supply cassette 6 is formed between the chute 80 and the underbars 130. Accordingly, the spaces can be formed while still maintaining sufficient strength of the laser printer 1.

Since the tray 120 serves to fix the left and right frames 100 and 110 together and to support the scanning unit 16, there is no need to provide separate parts for serving these functions, thereby making effective use of the internal space in the laser printer 1.

Since the first chute 80*a* is formed of a flame-retardant resin, the guide plates 80*c* can be disposed above the low-voltage power source circuit board 90 at a position near the heat sources of the low-voltage power source circuit board 90. Accordingly, the internal space of the laser printer 1 can be effectively used.

While the invention has been described in detail with reference to specific embodiments thereof, it would be apparent to those skilled in the art that many modifications and variations may be made therein without departing from the spirit of the invention, the scope of which is defined by the attached claims.

For example, the tray 120 and the underbars 130 can also be formed of a resin like the left and right frames 100 and 110. Further, while the chute 80 in the above embodiment is constructed in two parts, the entire chute 80 can be formed of a non-flame-retardant resin. In this case, a cover formed of a flame-retardant resin can be provided on the portion of the chute 80 corresponding to the positions of heat generating components in the low-voltage power source circuit board 90 and the engine circuit board 98.

What is claimed is:

1. An image forming device comprising:

a pair of frames formed of a synthetic resin including no glass fibers; and a processing unit accommodated between the pair of frames, the processing unit comprising:

an electrostatic latent image carrying member;

a developing unit that develops an electrostatic latent image formed on the electrostatic latent image carrying member with a developer into a visible image;

a transfer member that transfers the visible image from the electrostatic latent image carrying member onto a recording medium; and a drive member disposed on one of the pair of frames and coated with grease, wherein the one of the pair of frames on which the drive member is disposed is formed of a synthetic resin having a high resistance to grease.

2. The image forming device according claim 1, wherein each of the pair of frames is formed of a synthetic resin, but of a different material.

3. The image forming device according to claim 1, further comprising an exposing unit that forms an electrostatic latent image on the electrostatic latent image carrying member and a first reinforcing member that supports the exposing unit at a position above the processing unit, the first reinforcing member having left and right ends, each being fixed to a corresponding one of the pair of frames.

4. The image forming device according to claim 3, further comprising:

a casing on which the processing unit is detachably mounted;

a second reinforcing member disposed below the processing unit, the second reinforcing member having left and right ends, each being fixed to a corresponding one of the pair of frames; and a conveying mechanism that conveys a recording medium above the second reinforcing member in a conveying direction.

5. The image forming device according to claim 4, wherein the second reinforcing member is formed with a recess extending in the conveying direction.

6. The image forming device according to claim 4, wherein the second reinforcing member serves as a conveying guide that conveys the recording medium over a top surface thereof and includes a non-flame-retardant resin part that does not include a flame retardant and a flame-retardant resin part that does include a flame retardant.

7. The image forming device according to claim 6, further comprising a power source that supplies a drive voltage to the processing unit and that has a component that generates heat, wherein the second reinforcing member is disposed to cover the power source in a manner that the component of the power source is in confrontation with the flame-retardant resin part.

8. The image forming device according to claim 7, wherein the power source is disposed below the second reinforcing member.

9. The image forming device according to claim 7, further comprising a high-voltage power source circuit board disposed below the non-flame-retardant resin part of the second reinforcing member, wherein the power source is a low-voltage power source circuit board and disposed below the flame-retardant resin part of the second reinforcing member.

10. The image forming device according to claim 1, further comprising:

an exposing unit that forms an electrostatic latent image on the electrostatic latent image carrying member;

a first reinforcing member that supports the exposing unit at a position above the processing unit, the first reinforcing member having left and right ends, each being fixed to a corresponding one of the pair of frames;

a second reinforcing member disposed below the processing unit, the second reinforcing member having left and right ends, each being fixed to a corresponding one of the pair of frames;

a conveying mechanism that conveys a recording medium along a top surface of the second reinforcing member;

a first casing in which the processing unit is detachably mounted;

a sheet supply cassette that accommodates a stack of recording medium;

a second casing in which the sheet supply cassette is detachably mounted; and a third reinforcing member positioned below the sheet supply cassette, the third reinforcing member having left and right ends, each being fixed to a corresponding one of the pair of frames, wherein the first and third reinforcing members are formed of steel, and the second reinforcing member is formed of a resin.

11. The image forming device according to claim 1, wherein each of the pair of frames has a box shape.

12. An image forming device comprising:

a processing unit including:

an electrostatic latent image carrying member;

a developing unit that develops an electrostatic latent image formed on the electrostatic latent image carrying member with developer into a visible image; and a transfer member that transfers the visible image from the electrostatic latent image carrying member onto a recording medium; and a conveying guide member disposed below the processing unit, the conveying guide member guiding the recording medium that is conveyed over the top surface of the conveying guide member, the conveying guide member including a non-flame-retardant resin part that does not include a flame retardant and a flame-retardant resin part that includes a flame retardant.

13. The image forming device according to claim 12, further comprising a power source that supplies a drive voltage to the processing unit and that has a component that generates heat, wherein the conveying guide member is disposed to cover the power source in a manner that the component of the power source is in confrontation with the flame-retardant resin part of the conveying guide member.

14. The image forming device according to claim 13, wherein the power source is disposed below the conveying guide member.

15. A frame used in an image forming device, comprising:

a pair of frame members formed of a synthetic resin including no glass fibers, each of the frame members having a box shape; and a first reinforcing member that bridges the frame members, the reinforcing member including a non-flame-retardant resin part that does not include a flame retardant and a flame-retardant resin part that includes a flame retardant.

16. The frame according to claim 15, further comprising a second reinforcing member that bridges the frame members and a third reinforcing member that bridges the frame members, wherein the second reinforcing member and the third reinforcing member are both formed of metal, and one of the frame members is formed of a synthetic resin having a high resistance to grease.

* * * * *